Oct. 24, 1961  J. E. COLLIER  3,005,647
BALL JOINT
Filed Aug. 7, 1957
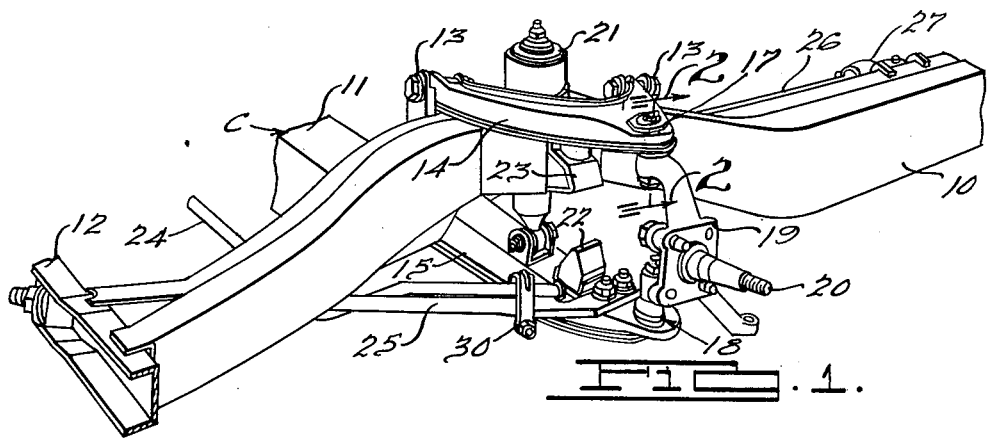
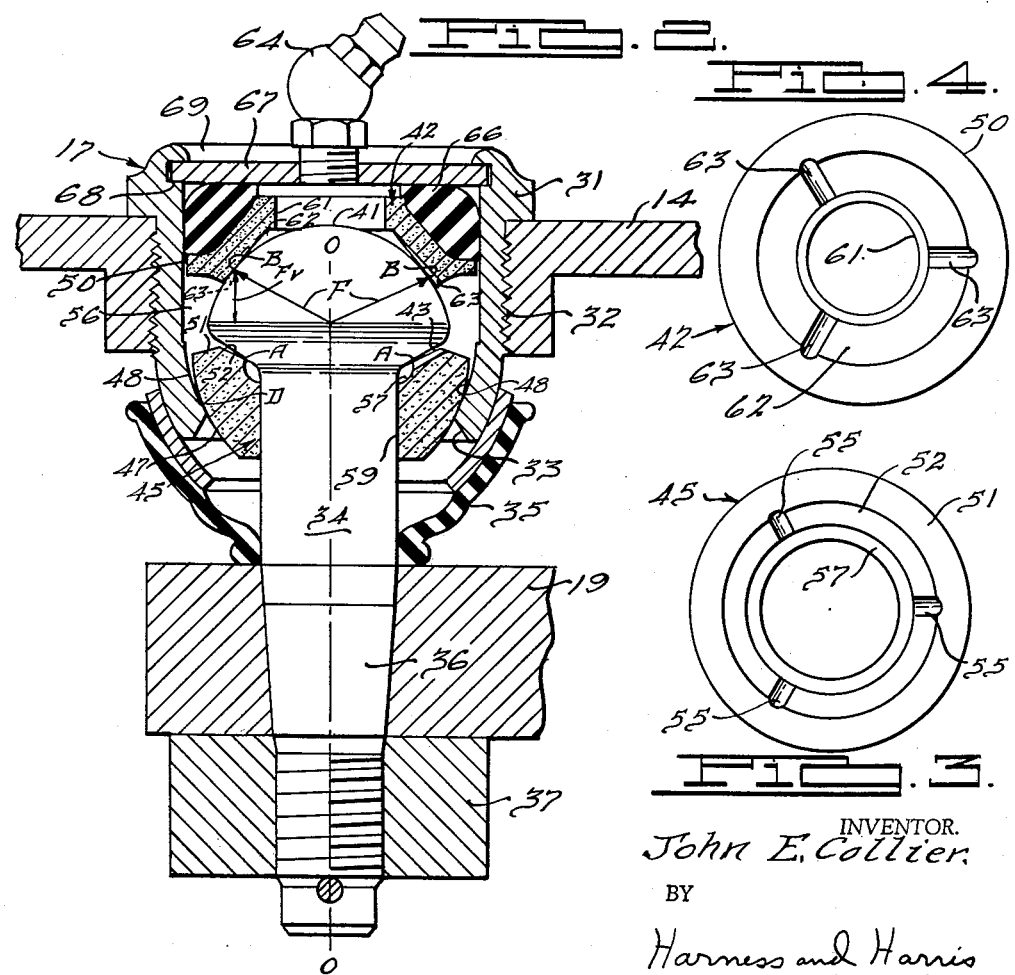
INVENTOR.
John E. Collier,
BY
Harness and Harris
ATTORNEYS.

United States Patent Office 3,005,647
Patented Oct. 24, 1961

3,005,647
BALL JOINT
John E. Collier, Detroit, Mich., assignor to Chrysler Corporation, Highland Park, Mich., a corporation of Delaware
Filed Aug. 7, 1957, Ser. No. 676,784
7 Claims. (Cl. 287—90)

This invention relates to a ball joint and particularly to a ball joint for use in independently suspended wheels of a motor vehicle chassis suspension system.

It is a primary object of this invention to provide a ball joint unit wherein the major forces applied to the ball joint stud are transmitted to the ball joint housing through a pair of upper and lower annular bearing rings.

It is a further object of this invention to provide a ball joint wherein the ball joint stud head has a pair of upper and lower angularly related or converging bearing surfaces that are respectively engaged through line contact by a pair of upper and lower bearing rings.

It is still another object of this invention to provide a ball joint wherein the ball joint stud head has the lower portions thereof engaged by a bearing ring having line contact with the stud head at a minimum radius from the axis of rotation of the stud to thereby reduce the frictional forces resisting rotation of the stud.

It is still another object of this invention to provide a ball joint with a stud head having a lower bearing ring engaged with a lower portion of the stud head at a location reasonably close to the axis of rotation of the stud and upper bearing ring urged into engagement with an upper portion of the stud head by means of a resilient ring that transmits the major forces applied to the upper bearing ring to the ball joint housing side walls, said resilient ring being arranged to continuously pressure load the two bearing rings to keep them in seated engagement with the ball joint stud.

It is still another object of this invention to provide a ball joint unit wherein upper and lower bearing rings seat the ball joint stud head within the ball joint housing and each bearing ring includes groove-like channels for the circulation of lubricant across the various bearing surfaces between the stud head and the associated bearing rings and the ball joint housing bearing surfaces.

It is still another object of this invention to provide a ball joint wherein the engaged bearing surfaces between the stud head, the bearing rings and the housing are of dissimilar curvatures so that these engaged bearing surfaces are initially line contacts which through working develop into narrow bands of surface contact that automatically provide lapped bearing seats for the joint.

Other objects and advantages of this invention will become readily apparent from a reading of the following description and a consideration of the related drawings wherein:

FIG. 1 is a fragmentary perspective view of an independent wheel suspension of a motor vehicle using ball joints embodying this invention;

FIG. 2 is an enlarged sectional elevational view taken along the line 2—2 of FIG. 1 showing the upper ball joint unit;

FIG. 3 is a top plan view of the lower bearing ring used in the ball joint unit shown particularly in FIG. 2; and FIG. 4 is a bottom plan view of the upper bearing ring used in the ball joint unit shown in FIG. 2.

FIG. 1 of the drawings shows a portion of a vehicle chassis frame which is representative of a front wheel suspension of a motor vehicle. The chassis frame C includes a side rail 10 and cross frame members 11 and 12 which are adapted to be connected to an opposite side rail member (not shown). Pivotally connected to the side rail 10 by the pivot pins 13 is an upper control arm 14. Likewise, pivotally connected to the cross frame member 11 (by pivot means not shown) is a lower control arm member 15. Control arm members 14 and 15 are arranged to pivot about axes which extend substantially longitudinally of the vehicle. The free end of the upper control arm 14 mounts an upper ball joint unit 17 which is shown in detail in FIG. 2. Likewise, the lower control arm 15 mounts an inverted ball joint unit 18 which may be similar to the ball joint unit shown in FIG. 2. Extending between the upper and lower ball joint units 17 and 18 is a steering knuckle 19 having a spindle 20 on which a road wheel is intended to be journaled.

The lower control arm 15 is connected to the chassis frame side rail 10 through a shock absorber unit 21 that forms no part of this invention. Lower control arm member 15 also mounts a jounce bumper 22 engageable with a stop 23 on the chassis side rail 10 to provide means to limit the upward pivoting movement of the control arms 14, 15. A sway bar element 24 has its intermediate portion journaled on the chassis frame C by means not shown and its opposite end portions are respectively connected by clamps 30 to the lower control arm members 15 on the opposite sides of the chassis frame. In the particular suspension shown a stabilizing link 25 is also connected to the lower control arm 15 by bolts 29 and it has a universal type of resilient connection to the forward cross frame member 12. The reference numeral 26 represents a torsion bar that is anchored to the chassis frame at 27 and has its forward end portion (not shown) drivingly connected to the associated lower control arm 15 so that pivoting movement of the lower control arm 15 will torsionally stress the torsion bar 26. The particular type of front wheel suspension herebefore described is not a necessary part of this invention, which relates specifically to the ball joint units 17 and 18, but this type of wheel suspension is an excellent example of a particular use of this invention. As the invention can be completely defined with respect to upper ball joint unit 17 alone, no detailed description will be given as to the lower ball joint unit 18 although it is to be understood that this invention is not limited to either an upper ball joint or a lower ball joint but to ball joints in general.

From FIG. 2 it will be noted that the upper control arm 14 has an inverted, bell-shaped, ball joint housing 31 threadably mounted therein by means of threads 32 that are seated in a mating bore in the upper control arm 14. The housing 31 has an opening 33 at its lower end through which the ball joint stud 34 projects. A combination rubber and metal ring seal assembly 35 closes the opening 33 at the lower end of the ball joint housing 31 to prevent foreign matter from entering the interior of the housing through the opening 33. It will be noted that the ball joint stud 34 has a tapered portion 36 that is adapted to seat in a tapered bore formed in the steering knuckle upper end 19. A nut 37 is threaded on the lower end of the stud 34 to anchor it in the control arm 19.

The head portion of the stud 34 is formed with a hemispherical upper end portion 41 that is adapted to journal on the dished upper bearing ring 42. Upper bearing ring 42 may be of some self lubricating material such as "Oilite." Connecting the hemispherical portion 41 of the stud head to the stud shank is an inverted frustoconical head portion 43. The portion 43 of the stud head is adapted to journal on the upwardly arched top surface of the lower bearing ring 45. Ring 45 may also be of some self lubricating material such as "Oilite." The exterior curved side surface 47 of the lower bearing ring 45 is a portion of a sphere and it is arranged to seat upon the bearing surface 48 formed on the interior of the housing 31 adjacent the opening 33 therein. The interior wall bearing surface 48 on housing 31 is essentially an inverted frusto-conical surface in the bearing area. This frusto-conical surface 48 merges into a cylindrical surface at its upper end above its bearing contact portion. As the curvatures of the frusto-spherical bearing surface 47 on the bearing 45 and the frusto-conical bearing surface 48 on the interior of the housing 31 are dissimilar there is no mating surface engagement but rather a line engagement at the point indicated by the letter D. This line engagement between the bearing ring 45 and the housing bearing surface 48 is quite advantageous in that the engaged parts contact at a minimum area and any working between the parts merely tends to lap in and improve the seating arrangement so that a true ball joint swivel action is obtained with a minimum of friction due to the free circulation of lubricant across the engaged bearing contacts.

The top surface of the lower bearing ring 45 is formed from two upwardly arched, converging, annular portions 51 and 52 respectively. The radially innermost surface portion 52 slopes at an angle that differs slightly from the angularity of the frusto-conical portion 43 on the underside of the ball joint stud head. This difference in slope between the surface portions 43 and 52 causes a line contact between these surfaces at the point A which is quite close to the stud shank portion 34. By having the contact point A as close as possible to the axis of rotation O—O of the stud 34, the effect of friction opposing rotation of the stud 34 is reduced to a minimum. It will be noted that the surface portion 52 on the upper end of the bearing ring 45 (see FIG. 3) has a plurality of radially extending lubricant grooves 55 which permit lubricant to pass from the housing interior area 56 to the chamber 57 adjacent the stud shank portion. Lubricant in the chamber 57 can flow downwardly along the shank exterior surface to continuously lubricate the surface contact between the stud shank and the bore 59 in the bearing ring 45.

As previously pointed out the hemispherical surface portions 41 on the top side of the stud head 34 is journaled in the dished, bearing ring 42. This bearing ring 42 has a bore 61 extending through its central portion and from this bore 61 diverges a frusto-conical bearing portion 62 that is adapted to surround and seat upon a portion of the stud hemispherical bearing surface 41. Upper bearing ring 42 has an outer periphery 50 that is of such a size that it loosely fits within the housing chamber 56. Periphery 50 is close enough to the housing interior walls to prevent extrusion of the resilient washer 66 therebetween. Due to the difference in angularity between the frusto-conical upper bearing ring surface 62 and the hemispherical surface 41 on the top of the stud head, there is substantially line contact between the stud head surface 41 and the bore surface 62 of the upper bearing 42 at the point indicated by the letter B. It will also be noted (see FIG. 4) that the frusto-conical surface 62 of the upper bearing ring 42 has a plurality of radially extending lubrication grooves 63 to insure proper lubrication of the bearing surface between the upper bearing ring 42 and the stud surface 41. Grooves 63 will also permit the free transfer of lubricant from the lubrication fitting 64 through the bore 61 and thence through the grooves 63 to the housing interior area 56. Lubricant in area 56 can pass from that area through lower bearing ring grooves 55 to chamber 57 and stud bore 59.

To resiliently preload the upper bearing ring 42 against the surface portion 41 of the stud head, a resilient annulus of rubber or rubber-like material 66 surrounds the upper bearing ring 42 and extends between the bearing ring 42 and the interior walls of the housing 31. Resilient annulus 66 is preloaded during assembly of the ball joint when the cover plate 67 is pressed into position on its seat 68 in the housing 31 by spinning over the portions 69 of the housing.

It has been established by tests that the major forces transmitted between the hermispherical stud head portion 41 and the ball joint housing 31 extend in the directions indicated by the arrows F. Heretofore it has been common practice to directly apply the stud head transmitted forces to the cover plate 67 of the housing of the ball joint housing at about the center of the cover plate and under such conditions the movement of the stud in an axial direction tends to pound on the cover plate and permit unseating of the lower bearing ring 45 from its seat D on the housing bearing surface 48. With the arrangement shown in FIG. 2, the forces F applied at the location B of upper bearing ring 42 are transmitted substantially radially through the rubber annulus 66 to the side wall of the housing 31 as well as to the cover plate 67 and the load on the cover plate 67 is greatly reduced. Furthermore, by having the contact location B between the upper bearing ring 42 and the stud head 41 spaced radially outwardly from the axis O—O of the stud, the axial components $F_v$ (see FIG. 2) of the forces F are materially smaller than the axial forces applied to the cover plate when the engagement between the stud head 41 and the cover plate 67 is on or close to the intersection of the axis O—O of the stud with the cover plate.

In conclusion it should be pointed out that this ball joint construction features line contact, rather than surface contact, between the stud head portions 41, 43 and each of the upper and lower bearing rings 42 and 45 respectively. Secondly, the support of the stud head portion 43 on the lower bearing ring 45, as indicated by circle A, is located as close to the rotational axis O—O of the stud 34 as is possible so as to reduce friction loadings on the stud that would oppose stud rotation. Thirdly, the upper bearing ring 42 is arranged to transmit the major stud loads to the side walls of the housing 31 rather than to the housing cover plate 67. Fourthly, the bearing rings 42, 45 and their arrangement in the housing 31 as well as their arrangement with respect to the stud 34 are such as to insure a continuously lubricated, noise-free, minimum wear, efficient, ball joint.

While the ball joint unit 17 specifically described has been shown as an upper ball joint unit in a motor vehicle independent wheel suspension assembly, still, substantially the same ball joint could be used in the lower ball joint unit 18. However, in a lower ball joint unit it would not be necessary to use a resilient means such as the annulus 66, because of the direction of the applied forces, so this element of the joint would be eliminated in certain ball joint applications. Also, this type of ball joint could be used in tie rod applications and many other linkages.

I claim:

1. A ball joint assembly comprising a housing having a first opening at one end to receive a stud and a second opening at the other end adapted to be covered by a cover plate, said housing having an annular frusto-conical bearing surface formed on the interior side walls thereof adjacent said first opening, a stud having the shank portion thereof projecting from said first opening and the head portion thereof positioned within and spaced from the housing interior walls, said head portion including integral upper and lower converging annular bearing surfaces, a lower bearing ring surrounding said stud shank portion and having a convexly curved exterior surface of revolution seated on the housing interior wall bearing surface and arranged to have line contact bearing engagement with the housing interior side wall bearing surface, said lower bearing ring having a top surface providing an edge portion shaped and arranged to have line contact bearing engagement with the lower bearing surface of the head portion of said stud, said line contact between the top of said lower bearing ring and said stud head portion being close to the periphery of the stud shank portion.

2. A ball joint assembly comprising a housing having a first opening at one end to receive a stud and a second opening at the other end adapted to be covered by a cover plate, said housing having an inverted frusto-conical bearing surface formed on the interior side walls thereof adjacent said first opening, a stud having the shank portion thereof projecting from said first opening and the head portion thereof positioned within and spaced from the housing interior walls, said head portion including an integral upper hemispherical bearing surface and an integral lower inverted frusto-conical bearing surface arranged in converging relationship, a first bearing ring in said housing surrounding said stud shank portion and having a frusto-spherical exterior surface arranged to seat on and have line contact bearing engagement with the frusto-conical bearing surface on the housing interior side wall, said first bearing ring having an upwardly arched top surface with a portion thereof arranged to seat on and have a line contact bearing engagement with the inverted frusto-conical bearing surface on the head portion of said stud closely adjacent the periphery of the stud shank, and resilient means in said housing to load the stud head and urge the contacting bearing surfaces into engagement.

3. A ball joint assembly comprising a housing having a first opening at one end to receive a stud and a second opening at the other end adapted to be covered by a cover plate, said housing having an inverted frusto-conical bearing surface formed on the interior side walls thereof adjacent said first opening, a stud having the shank portion thereof projecting from said first opening and the head portion thereof positioned within and spaced from the housing interior walls, said head portion including an integral upper hemispherical bearing surface and an integral lower inverted frusto-conical bearing surface arranged in converging relationship, a first bearing ring in said housing surrounding said stud shank portion and having a frusto-spherical exterior surface arranged to seat on and have line contact bearing engagement with the frusto-conical bearing surface on the housing interior wall, said first bearing ring having an upwardly arched top surface arranged to seat on and have a line contact bearing engagement with the inverted frusto-conical lower bearing surface on the head portion of said stud closely adjacent the stud periphery, a second bearing ring having a frusto-conical bearing surface therein arranged to surround and seat on the hemispherical bearing surface of the stud head to have line contact bearing engagement therewith at a location spaced radially outwardly from the periphery of the stud, and resilient means in said housing acting on said second bearing ring to load the stud head and urge the contacting bearing surfaces into engagement with said resilient means being arranged to transmit a portion of the stud thrust loads to the housing side walls.

4. A ball joint assembly comprising a housing having a first opening at one end and a second opening at the other end covered by a cover plate, said housing having a surface of revolution constituting a bearing surface formed on the interior side walls thereof adjacent to and shaped to converge towards said first opening, a stud having the head portion positioned in said housing with the shank portion thereof projecting from said first opening, said head portion being spaced from the housing interior walls and including integral inner and outer converging annular bearing surfaces, a first bearing ring surrounding said stud shank portion and having a convexly curved exterior surface of revolution of a dissimilar shape from the housing interior wall bearing surface seated on and arranged to have line contact bearing engagement with the housing interior side wall bearing surface, said first bearing ring having a top surface provided with a corner edge portion in a line contact bearing engagement with the inner bearing surface of the head portion of said stud, a second bearing ring having a frusto-conical bearing surface seated on a convexly curved portion of the outer bearing surface of said stud head and arranged to have line contact with the outer bearing surface on said stud head at locations spaced outwardly from the periphery of the shank of said stud, and resilient means in said housing arranged between said housing and said second bearing ring to urge the last-mentioned contacting bearing surfaces into engagement and to transmit forces between the stud head and the housing interior walls.

5. A ball joint assembly comprising a housing having a first opening at one end to receive a stud and a second opening at the other end covered by a cover plate, said housing having a surface of revolution constituting a bearing surface formed on the interior side walls thereof adjacent to and shaped to converge towards said first opening, a stud having the head portion positioned in said housing with the shank portion thereof projecting from said first opening, said head portion being spaced from the housing interior walls and including integral, angularly related, upper and lower annular bearing surfaces, a first bearing ring surrounding said stud shank portion and having an annular exterior surface of revolution of a dissimilar shape from the housing interior wall bearing surface seated on and arranged to have line contact bearing engagement with the housing interior side wall bearing surface, said first bearing ring having an upstanding edge portion on the surface thereof adjacent said stud head in a line contact bearing engagement with the adjacent one of the bearing surfaces on the head of said stud, a second bearing ring having a bearing seat portion formed thereon by a converging surface of revolution that engages by line contact a convexly curved portion of the other bearing surface on the head of the stud, and resilient means in said housing arranged to load the stud head and urge the last-mentioned contacting bearing surfaces into engagement and to transmit thrust forces between the stud head and the housing interior walls.

6. In a ball joint assembly as set forth in claim 5 wherein the line contact between the first bearing ring and said one bearing surface of the stud head is located close to the periphery of the stud shank portion.

7. In a ball joint assembly as set forth in claim 5 wherein the line contact between the first bearing ring and said one bearing surface of the stud head is located close to the periphery of the stud shank portion and wherein the line contact between the second bearing ring and the other bearing surface of the stud head is spaced radially outwardly from the longitudinal axis of rotation of the stud so as to be close to the periphery of the stud head portion.

References Cited in the file of this patent

UNITED STATES PATENTS

| | | |
|---|---|---|
| 2,147,816 | Hufferd et al. | Feb. 21, 1939 |
| 2,257,346 | Paulus | Sept. 30, 1941 |
| 2,507,087 | Booth | May 7, 1950 |
| 2,569,823 | Moskovitz | Oct. 2, 1951 |
| 2,701,151 | Booth | Feb. 1, 1955 |
| 2,873,130 | Moskovitz | Feb. 10, 1959 |

FOREIGN PATENTS

| | | |
|---|---|---|
| 264,575 | Great Britain | Jan. 19, 1927 |